United States Patent Office 3,121,718
Patented Feb. 18, 1964

3,121,718
METAL CHELATES OF QUINACRIDONE-QUINONES
James F. Higgins, Livingston, N.J., assignor to E. I. du Pont de Nemours and Company, Wilmington, Del., a corporation of Delaware
No Drawing. Filed June 18, 1962, Ser. No. 202,995
6 Claims. (Cl. 260—270)

This invention relates to metal chelates of quinacridonequinone compounds. These compounds are colored materials possessing good lightfastness, and they are useful as pigments.

Quinacridonequinone, also known as quin (2,3b) acridone-6,7,13,14(5,12) tetrone, appears to have been first described by Sharvin in J. Rus. Phys. Chem. Soc. 47, 1260 (1915); C.A. vol. 9, 3056 (1915). It is commonly prepared by condensing benzoquinone with anthranilic acid in the presence of an excess of benzoquinone to give quinone dianthranilic acid which is, in turn, cyclized by heating in concentrated sulfuric acid to give quinacridonequinone. Substituted quinacridonequinones can be prepared by using the appropriately substituted anthranilic acid. For example, 2-amino-5-chloro benzoic acid can be used to produce a chlorinated derivative of quinacridonequinone.

Quinacridonequinones gives a yellow color when used as pigments, especially in tint, and they give a golden metallic finish when mixed with Al flake. However, quinacridonequinone compounds are deficient in lightfastness when used alone and as pigments. For this reason, means have been sought to improve the lightfastness of these compounds.

It has now been found that compounds of quinacridonequinone with improved light stability can be prepared by reacting its substituted derivatives with certain metal salts of nickel, copper, and zinc to produce compounds in which the metal is chelated with the organic molecule. These chelates may be represented by the following generic formula:

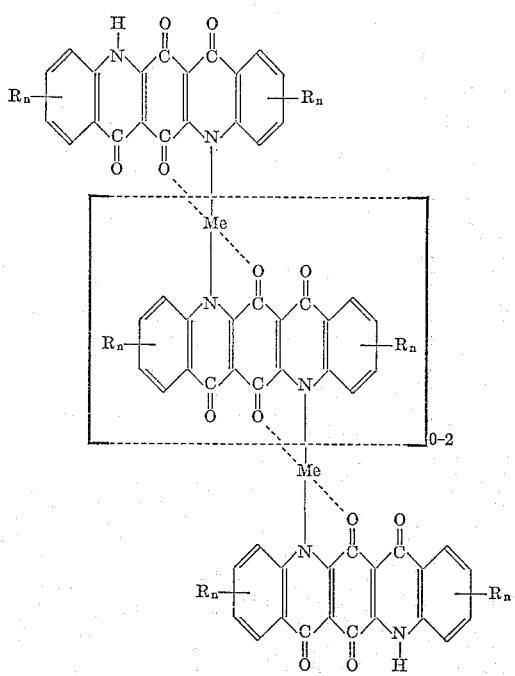

wherein R is from the group consisting of halogen, alkyl radicals of 1–3 carbon atoms, and alkoxy radicals of 1–3 carbon atoms, $n$ is an integer of 0 to 2, and Me is from the group consisting of nickel, zinc, and copper. In compounds of the type disclosed in this invention, the actual end product obtained is a mixture of chelates coming under the above generic formula rather than a specific monomer or polymer. Therefore, the number of nickel atoms per molecule of quinacridonequinone is a statiscal average of such mixtures. The formation of mixtures rather than a specific compound is often encountered in complex molecules of this type. For example, in chlorinated copper phthalocyanines, the quantity of chlorine is considered to be a statistical average based upon a mixture wherein there are various degrees of substitution of the phthalocyanine molecules in such mixture. The same situation occurs with compounds of the present invention. It is also possible in the above formula to have partially chelated metal atoms attached to the end groups through the same linkages shown above. When these latter compounds are formed, the metal content is necessarily higher than that of compounds having the above formula.

As mentioned above, this invention is applicable to substituted quinacridones in which the substituent is a halogen such as a fluorine, bromine, chlorine, or iodine atom. Also, the quinacridone may be substituted with methyl, ethyl, or propyl groups or the corresponding alkoxy groups, that is, the methoxy, ethoxy, and propoxy groups. Representative of such substituted quinacridones are the following compounds: 4,11-difluoroquinacridonequinone, 2,9-dichloroquinacridonequinone, 2,4,9,11-tetrachloroquinacridonequinone, 2,9-dimethylquinacridonequinone, and 2,9-dimethoxyquinacridonequinone.

The products of this invention may be prepared by suspending the quinacridonequinone in a high-boiling polar liquid, such as dimethylformamide, and reacting it with a nickel salt, such as nickel acetate, by heating, preferably to the boiling point of the liquid used. In a preferred embodiment, 2 mols of quinacridonequinone is suspended in 20 to 30 times its weight of dimethylformamide together with about 3 mols of nickel acetate and the mixture heated to the boil and kept at the boil under reflux for several hours. If samples are taken at various time intervals during the boil, it is found that those taken after boiling for 1 to 1.5 hours have a nickel content approximating that of a chelate with one nickel atom per 2 molecules of quinacridonequinone. As the boiling progresses, more nickel is introduced so that the ultimate composition, after about 5 hours, approaches that of 2 such units chelated with a third atom of nickel, a ratio of 3 atoms of nickel to 4 molecules of quinacridonequinone.

When such products are incorporated into a coating composition and subjected to outdoor exposure, their lightfastness is vastly superior to that of quinacridonequinone. Moreover, the lightfastness of the products with the lesser nickel content is equally as good as the product with the high nickel content. However, the change in color intensity and hue as compared with quinacridonequinone is slightly greater with increasing nickel content.

For a clearer understanding of the invention, the following specific examples are given. These examples are intended to be merely illustrative of the invention and not in limitation thereof. Unless otherwise specified, all parts are by weight.

Example I 30 parts of quinacridonequinone, 880 parts of dimethylformamide, and 32.5 parts of nickel acetate $(Ni(C_2H_3O_2)_2 \cdot 4H_2O)$ are mixed in a suitable vessel equipped for agitation, for external heating, and for reflux of any vapors arising upon heating. While being well stirred, the mixture is heated to the boil and boiled under reflux for about 1.5 hours. The solid is removed by filtration at 100° C. and washed on the funnel with water. It is then reslurried in 1500 parts water, heated to the boil, filtered, washed free of Ni++ ion and dried to give a quantitative yield of a brownish solid which contains 6.8% Ni, this being somewhat less than the 7.92% Ni required for a chelate containing one Ni atom per 2 molecules of quinacridonequinone.

When dispersed in a coating composition vehicle, along with a small amount of flake aluminum, and coated on a surface such as a test panel, a rather dark brown of good intensity is obtained. The new product of this example shows only a trace of darkening after 3 months' exposure in Florida. On the other hand, quinacridonequinone in a similar test darkens badly. A tint prepared by dispersing the new pigment in a composition containing TiO$_2$ is a yellowish orange color which shows only a very slight fading on 3 months' exposure. When quinacridonequinone is tinted and exposed in the same manner, the yellow color fades badly.

*Example II*

Using the same ingredients and procedure as in Example I except that the time at the boil in dimethylformamide is increased from 1.5 hours to 2 hours, there is obtained a quantitative yield of a product containing 10.13% Ni which approximates the 10.3% Ni calculated for a chelate containing 2 atoms of Ni per 3 molecules of quinacridonequinone.

The product is a brownish powder. When dispersed in a coating composition vehicle, it appears a little more red in masstone and also more red in tint than the product of Example I. It is essentially equivalent in lightfastness.

*Example III*

By increasing the boiling period from 2 hours to 5 hours, the Ni content is increased to 10.9% which is midway between a polymeric chelate with 3 molecules of quinacridonequinone per two atoms of Ni (10.3% Ni) and a chelate containing 4 molecules of quinacridonequinone per 3 atoms of Ni (11.45% Ni).

The resulting brownish powder gives compositions with some further increase in redness compared to the product of Example II but with equivalent lightfastness.

*Example IV*

Using the proportions of ingredients shown in Example I and a 2-hour boiling period, the following polar solvents may be used in place of dimethylformamide to give nickel chelate compounds containing about 10% Ni:

(1) Dimethylsulfoxide
(2) N-methylpyrrolidone
(3) N-methylcaprolactam
(4) Tetramethylenesulfone
(5) Ethylene glycol.

*Example V*

5.0 parts of quinacridone, 150 parts of dimethylformamide and 3.65 parts of nickel acetate are mixed in a suitable flask. While stirring, the mixture is heated to the boil and held at the boil under reflux for 6 hours. The charge is filtered, washed with water, and dried to give a quantitative yield of a brownish powder having a nickel content of 8.5%. As a pigment, it is considered to be on the yellow side, and it possesses excellent lightfastness.

*Example VI*

3.15 parts of zinc acetate is used to replace the nickel acetate in Example V. After heating under reflux for about 6 hours and isolating the product as in Example V, an essentially quantitative yield of a yellow powder is obtained. It has a zinc content of about 9.0% and is a zinc chelate of quinacridonequinone with good pigmentary properties.

*Example VII*

13.7 parts of quinacridonequinone, 12 parts of cupric acetate, and 335 parts of dimethylformamide are heated together at reflux for about 5 hours. The slurry is then cooled to about 100° C. and filtered. It is reslurried in water, heated to the boil, filtered again, washed repeatedly with water and dried to give 17.6 parts of a dark olive green product containing 18.6% copper which approximates a hypothetical formula of 5 copper atoms for 4 molecules of quinacridonequinone. It is somewhat less lightfast than the nickel chelate but very much better than the untreated starting material.

*Example VIII*

7.8 parts of 4,11-difluoroquinacridonequinone is added to 335 parts of dimethylformamide and the mixture is heated to the boil. 6 parts of nickel acetate is then added slowly after which boiling is continued under reflux for about 6 hours. The mixture is cooled below 100° C., filtered, washed repeatedly with water and dried to give a quantitative yield of the reddish-tan nickel chelate of 4,11-difluoroquinacridonequinone which shows a marked improvement in lightfastness over the untreated starting material.

A product of similar tinctorial and fastness properties is obtained when the starting material is 4,11-dichloroquinacridonequinone.

*Example IX*

7.6 parts of 2,9-dichloroquinacridonequinone is added to 335 parts of dimethylformamide and heated to the boil. 6 parts of zinc acetate is then added and boiling continued under reflux for about 6 hours. The reddish violet zinc complex which is isolated by filtering, washing and drying shows good lightfastness.

*Example X*

7.6 parts of 2,4,9,11-tetrachloroquinacridonequinone and 6.0 parts of cupric acetate are added to 335 parts of dimethylformamide and the mixture is heated at the boil under reflux for about 6 hours. The resulting reddish violet copper chelate of the tetrachloroquinacridonequinone shows much better lightfastness than the untreated starting material.

It is apparent to one skilled in the art that there are two reactive hydrogens on the quinacridonequinone molecule which are capable of being replaced by a metal ion. However, structural considerations do not permit them both to react with the same metal ion, and therefore two molecules of quinacridonequinone generally enter into reaction with a given metal ion to satisfy both primary and coordinate bonds. Since additional metal ions may react with either or both of these quinacridonequinone radicals and, in turn, with more quinacridonequinone, it is apparent that a fixed ratio of organic molecule to metal is not predictable. In practice, it has been found that preferred products have a nickel content within the range of about 6.5% to 11.5% by weight, corresponding to a ratio of quinacridonequinone to nickel within the range of about 2:1 up to about 4:3. A more preferred nickel content is 8% to 10.3%. The latter nickel content (10.3%) corresponds to a ratio of quinacridonequinone to nickel of 3:2. These ratios of organic compound to metal are also preferred for zinc and copper chelates. On the other hand, the markedly higher copper content (18.6%) shown in Example VII is most readily explained on the basis that an organic molecule to metal ratio is the result of some metal ions being only partially chelated.

Some types of solvents useful in this invention have been set forth in Example IV. These are all polar, water-soluble solvents of high boiling point. It is not meant to imply that metal chelates of quinacridonequinone can be obtained only in these solvents but these are known to be especially effective. It is known, for instance, that some chelation may occur in methanol. The amount of solvent used is important only in so far as it results in a fluid, easily stirrable reaction mixture.

The choice of metal salt is dictated only by the fact that it must have some slight solubility in the reaction liquid. The various metal acetates serve well for this purpose but they are in no sense limiting. The amount of metal salt shown in the examples is an excess over theoretical. Such excess is convenient to insure complete reaction, but a theoretical amount may be used, if desired.

The temperature of the reaction appears to control the rate of reaction in a fairly conventional manner. Up to the boiling points of the liquids used, higher temperatures increase the rate and completion of the reaction. However, the reaction will proceed at temperatures as low as 60° C. but of course much longer reaction times are necessary.

The effect of variations in the time of reaction is largely as could be anticipated. The extent of reaction between the metal ion and the organic molecule appears to increase with time of reaction. At the boil, it appears to reach a maximum in about 4 to 6 hours beyond which continued heating exhibits no change. In shorter periods the metal content is less than the maximum but it has been shown that maximum metal content is not required to obtain the desired lightfastness improvements.

Although the method shown above is a preferred process for the manufacture of the chelated quinacridonequinones of this invention, other methods for producing these compounds are possible. For example, such chelates can be formed by reacting quinacridonequinone with ammoniacal complexes of nickel, copper and zinc in aqueous solution.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. Chelated quinacridonequinones of the following formula:

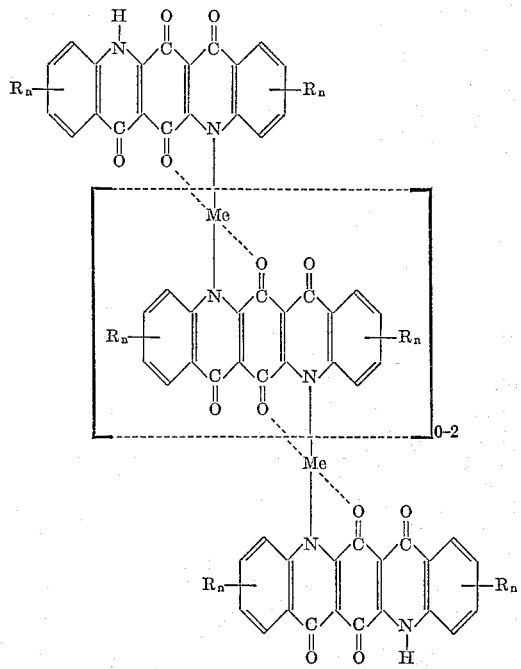

wherein Me is from the group consisting of nickel, zinc, and copper and R is from the group consisting of, halogen, alkyl of 1–3 carbon atoms, and alkoxy of 1–3 carbon atoms, and $n$ is an integer of 0 to 2.

2. Nickel chelates of quinacridonequinone of the following formula:

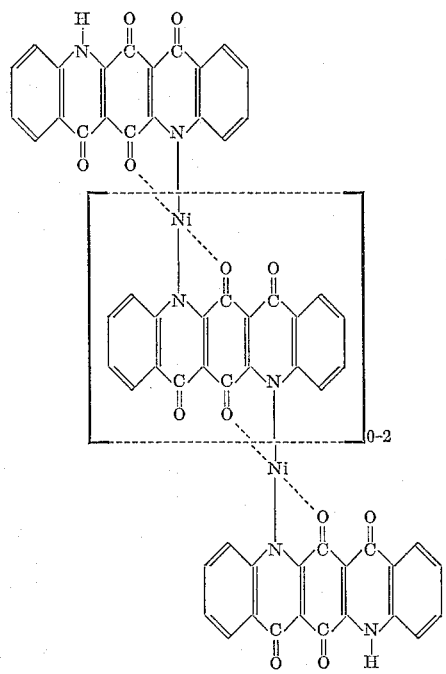

3. The nickel chelate of claim 2 wherein the nickel content is 6.5% to 11% by weight.
4. The nickel chelate of claim 2 wherein the nickel content is 8% to 10.3% by weight.
5. A process for the production of the metal chelates of claim 1 comprising reacting in a polar, water-soluble high-boiling organic liquid in a quinacridonequinone of the formula

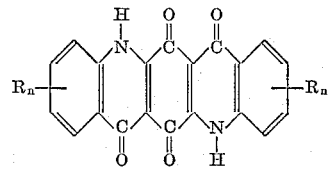

wherein R is from the group consisting of halogen, alkyl of 1–3 carbon atoms, and alkoxy of 1–3 carbon atoms, and $n$ is an integer of 0 to 2, with a metal salt wherein the metal is selected from the group consisting of nickel, zinc, and copper.
6. A process for the production of the nickel chelates of claim 2 which comprises reacting quinacridonequinone with nickel acetate while suspended in dimethylformamide.

No references cited.

UNITED STATES PATENT OFFICE
CERTIFICATE OF CORRECTION

Patent No. 3,121,718                              February 18, 1964

James F. Higgins

It is hereby certified that error appears in the above numbered patent requiring correction and that the said Letters Patent should read as corrected below.

Column 6, line 45, strike out "in".

Signed and sealed this 23rd day of June 1964.

(SEAL)
Attest:

ERNEST W. SWIDER                             EDWARD J. BRENNER
Attesting Officer                                 Commissioner of Patents